(12) United States Patent
Hu

(10) Patent No.: US 11,119,369 B1
(45) Date of Patent: Sep. 14, 2021

(54) ARRAY SUBSTRATE AND DISPLAY PANEL

(71) Applicant: HKC CORPORATION LIMITED, Guangdong (CN)

(72) Inventor: Yunqin Hu, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/260,225

(22) PCT Filed: Jan. 10, 2019

(86) PCT No.: PCT/CN2019/071067
§ 371 (c)(1),
(2) Date: Jan. 14, 2021

(87) PCT Pub. No.: WO2020/107663
PCT Pub. Date: Jun. 4, 2020

(30) Foreign Application Priority Data

Nov. 29, 2018 (CN) .......................... 201811445306.2
Nov. 29, 2018 (CN) .......................... 201811447419.6

(51) Int. Cl.
*G02F 1/136* (2006.01)
*G02F 1/1333* (2006.01)
(Continued)

(52) U.S. Cl.
CPC .... *G02F 1/13606* (2021.01); *G02F 1/133345* (2013.01); *G02F 1/133514* (2013.01); *G02F 1/134309* (2013.01); *G02F 1/136286* (2013.01)

(58) Field of Classification Search
CPC ...... G09G 2300/0408; G02F 1/136286; G02F 1/133345; G02F 1/134309; G02F 1/13606
See application file for complete search history.

(56) References Cited

U.S. PATENT DOCUMENTS

2015/0380349 A1* 12/2015 Yan .................. H01L 23/528
257/532
2017/0343865 A1* 11/2017 Kim .................... G09G 3/2007

FOREIGN PATENT DOCUMENTS

CN 103018991 A 4/2013
CN 103472606 A 12/2013
(Continued)

OTHER PUBLICATIONS

First Office Action in counterpart Chinese Application No. 201811445306.2, dated May 22, 2020.
(Continued)

*Primary Examiner* — Mariam Qureshi

(57) ABSTRACT

Disclosed is an array substrate including a first substrate, a first conductive layer, a first passivation layer, a second conductive layer, a second passivation layer, a first electrode layer, a liquid crystal layer, a second electrode layer, and a second substrate in order from bottom to top. The first conductive layer includes a plurality of first traces, the second conductive layer includes a plurality of second traces, and the respective plurality of first traces are connected to the corresponding plurality of second traces through traces of the first electrode layer. Each of the plurality of first traces is provided with a target area and a projection of each of the plurality of second traces on a corresponding connected first trace is located in a corresponding target area to reduce a load of a gate drive circuit and a capacitance between panels.

20 Claims, 3 Drawing Sheets

(51) Int. Cl.
    *G02F 1/1335*    (2006.01)
    *G02F 1/1362*    (2006.01)
    *G02F 1/1343*    (2006.01)

(56)              References Cited

FOREIGN PATENT DOCUMENTS

| CN | 103676382 A | 3/2014 |
| CN | 104730792 A | 6/2015 |
| CN | 104849928 A | 8/2015 |
| CN | 106991949 A | 7/2017 |
| CN | 107527599 A | 12/2017 |
| CN | 108363248 A | 8/2018 |
| CN | 109298575 A | 2/2019 |

OTHER PUBLICATIONS

The Second Office Action in counterpart Chinese Application No. 201811445306.2, dated Feb. 3, 2021.
First Office Action in counterpart Chinese Application No. 201811447419.6, dated May 8, 2020.
The Second Office Action in counterpart Chinese Application No. 201811447419.6, dated Aug. 26, 2020.
International Search Report in corresponding PCT Application No. PCT/CN2019/071067, dated Sep. 5, 2019 and Written Opinion of the International Searching Authority in corresponding PCT Application No. PCT/CN2019/071067, dated Sep. 5, 2019.

* cited by examiner

ARRAY SUBSTRATE AND DISPLAY PANEL

CROSS-REFERENCE TO RELATED APPLICATIONS

This application is the National Stage of International Application No. PCT/CN2019/071067, filed on Jan. 10, 2019, which claims priority to Chinese Patent Application No. 201811447419.6, entitled "Array Substrate and Display Panel" and filed in the Chinese Patent Office on Nov. 29, 2018, and Chinese Patent Application No. 201811445306.2, entitled "Array Substrate, Display Panel and Method for Manufacturing Array Substrate" and filed in the Chinese Patent Office on Nov. 29, 2018, which are hereby incorporated by reference in their entirety.

FIELD

This application relates to an array substrate and a display panel.

BACKGROUND

The statements here only provide background information related to this application, and do not necessarily constitute prior art.

Gate On Array (GOA) is an important technology in panel design. The main advantage is that it may eliminate gate drive integrated circuits and reduce product costs. The driver generates a clock signal and sends it to the gate drive circuit. The gate drive circuit provides a clock signal to each gate drive circuit through the clock signal line for line scanning.

Since the clock signal line is responsible for providing the signal to the gate drive circuit, of course, it is not expected that the signal will pass through these lines to cause signal attenuation. Generally, in Polymer Sustained Alignment (PSA) mode and Vertical Alignment (VA) mode, the signal resistance and signal capacitance of the clock signal line fall on one or both ends of the active switch. How to solve the problem of excessive load on the gate drive circuit has become an important issue.

SUMMARY

In order to solve the problem of excessive load of the gate drive circuit, the object of this application is to provide an array substrate and a display panel.

An array substrate, including:
a first substrate;
a first conductive layer formed on the first substrate;
a first passivation layer formed on the first conductive layer and covering part of the first substrate;
a second conductive layer formed on the first passivation layer;
a second passivation layer formed on the second conductive layer and covering part of the first passivation layer;
a first electrode layer formed on the second passivation layer and covering part of the first conductive layer, part of the first passivation layer, part of the second conductive layer and part of the second passivation layer;
a liquid crystal layer formed on the first electrode layer;
a second electrode layer formed on the liquid crystal layer; and
a second substrate formed on the second electrode layer;
where the first conductive layer includes a plurality of first traces, and the second conductive layer includes a plurality of second traces corresponding to the respective plurality of first traces, where the respective plurality of first traces are connected to the corresponding plurality of second traces through traces of the first electrode layer; and
where each of the plurality of first traces is provided with a target area, and a projection of each of the plurality of second traces on a corresponding connected first trace is located in a corresponding target area, where the target area is configured to reduce a capacitance between each of the plurality of first traces and the second electrode layer.

In one of the embodiments, the target area includes a cross-line area formed by each of the plurality of first traces and corresponding each of the plurality of second traces.

In one of the embodiments, the first passivation layer is covered on part of the first substrate in the target area.

In one of the embodiments, the target area is filled with a non-conductive material.

In one of the embodiments, a first type of conductive bridge hole is formed on the first conductive layer, and the first electrode layer is covered on the first conductive layer.

In one of the embodiments, a second type of conductive bridge hole is formed on the second conductive layer, and the first electrode layer is covered on the second conductive layer.

In one of the embodiments, a number of the first type of conductive bridge hole is at least two.

In one of the embodiments, the liquid crystal layer includes a dielectric coefficient, and the dielectric coefficient includes a dielectric coefficient of a parallel vector and a dielectric coefficient of a perpendicular vector.

A display panel, including a color filter substrate, a driver and an array substrate;
a first substrate;
a first conductive layer formed on the first substrate;
a first passivation layer formed on the first conductive layer and covering part of the first substrate;
a second conductive layer formed on the first passivation layer;
a second passivation layer formed on the second conductive layer and covering part of the first passivation layer;
a first electrode layer formed on the second passivation layer and covering part of the first conductive layer, part of the first passivation layer, part of the second conductive layer and part of the second passivation layer;
a liquid crystal layer formed on the first electrode layer;
a second electrode layer formed on the liquid crystal layer; and
a second substrate formed on the second electrode layer;
where the first conductive layer includes a plurality of first traces, and the second conductive layer includes a plurality of second traces corresponding to the respective plurality of first traces, where the respective plurality of first traces are connected to the corresponding plurality of second traces through traces of the first electrode layer; and
where each of the plurality of first traces is provided with a target area, and a projection of each of the plurality of second traces on a corresponding connected first trace is located in a corresponding target area, where the target area is configured to reduce a capacitance between each of the plurality of first traces and the second electrode layer.

In one of the embodiments, the target area includes a cross-line area formed by each of the plurality of first traces and corresponding each of the plurality of second traces.

The details of one or more embodiments of this application are set forth in the following drawings and description.

Other features and advantages of this application will become apparent from the description, drawings and claims.

BRIEF DESCRIPTION OF THE DRAWINGS

In order to more clearly describe the technical solutions in the embodiments of this application, the following will briefly introduce the drawings that need to be used in the description of the embodiments. Obviously, the drawings in the following description are only some embodiments of this application. For those of ordinary skill in the art, without creative work, other drawings can be obtained according to these drawings.

DETAILED DESCRIPTION OF THE EMBODIMENTS

In order to make the technical solutions and advantages of this application clearer, the following further describes this application in detail with reference to the accompanying drawings and embodiments. It should be understood that the specific embodiments described herein are only used to explain this application, and are not used to limit this application.

It should be noted that when an element is considered to be "connected" to another element, it may be directly connected to and integrated with another element, or there may be a centering element at the same time. The terms "installed", "one end", "the other end" and similar expressions used herein are for illustrative purposes only.

Unless otherwise defined, all technical and scientific terms used herein have the same meaning as commonly understood by those skilled in the technical field of this application. The terms used in the description of this application herein are only for the purpose of describing specific embodiments, and are not intended to limit this application. The term "and/or" as used herein includes any and all combinations of one or more related listed items.

Figure 1:
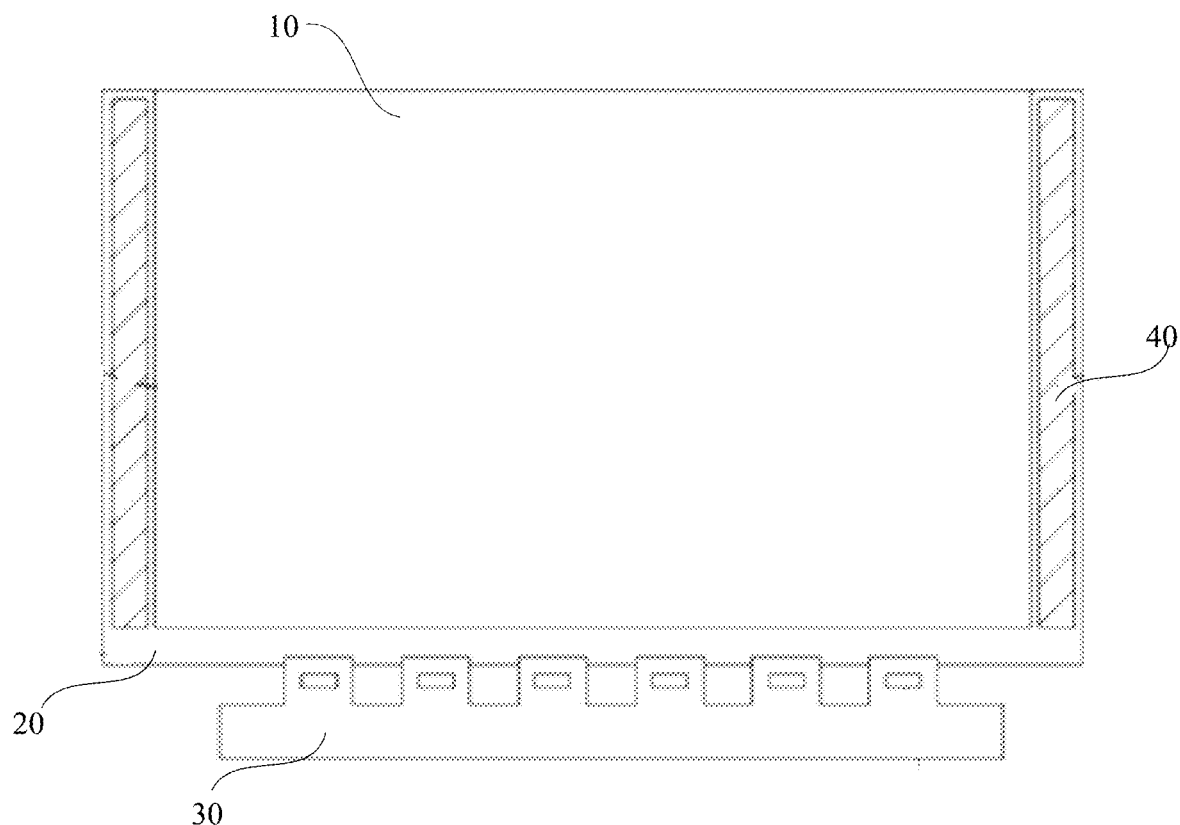
FIG. 1 is a schematic structural diagram of a display panel according to an embodiment.

As shown in FIG. 1, a display panel with a gate array drive using Gate On Array (GOA) technology includes a color filter substrate 10, an array substrate 20, a driver 30, and a gate drive circuit 40. The gate drive circuit 40 is made on the array substrate 20 instead of a drive chip made of an external silicon chip to drive the on-off of the thin film transistor. Because the GOA technology may directly arrange the gate drive circuit 40 around the display area of the display panel, the production process is simplified, the integration of the display panel is improved, and an ultra-thin design of the display panel is realized.

Figure 2:
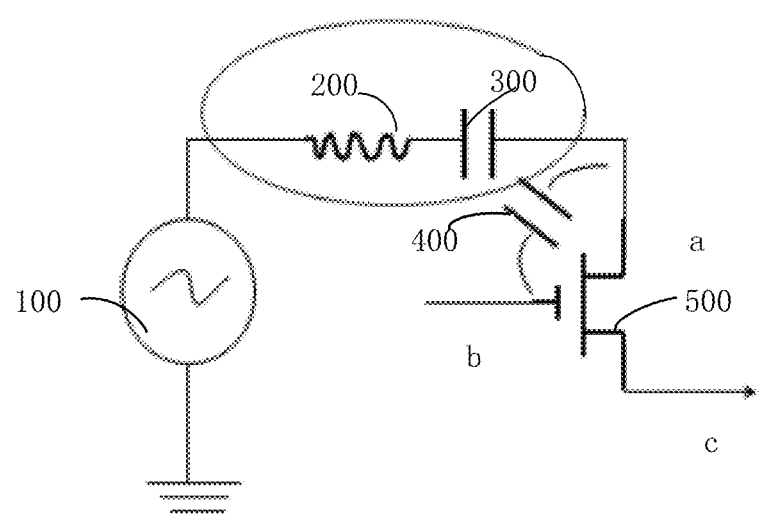
FIG. 2 is a schematic diagram of a capacitive load circuit according to an example.

When the gate drive circuit is used for gate drive, the capacitive load circuit is shown in FIG. 2. A clock voltage signal 100 sent by the driver is sent to an active switch via a signal line, a signal resistance 200 generated by the signal line, a signal capacitor 300, and a parallel capacitor 400 connected in parallel between a control terminal b of the active switch 500 and a first terminal a of the active switch 500. The signal resistor 200, the signal capacitor 300 and the parallel capacitor 400 all fall on the first terminal a and the control terminal b. The circuit load is too heavy, which affects the clock signal transmission effect.

Figure 3:
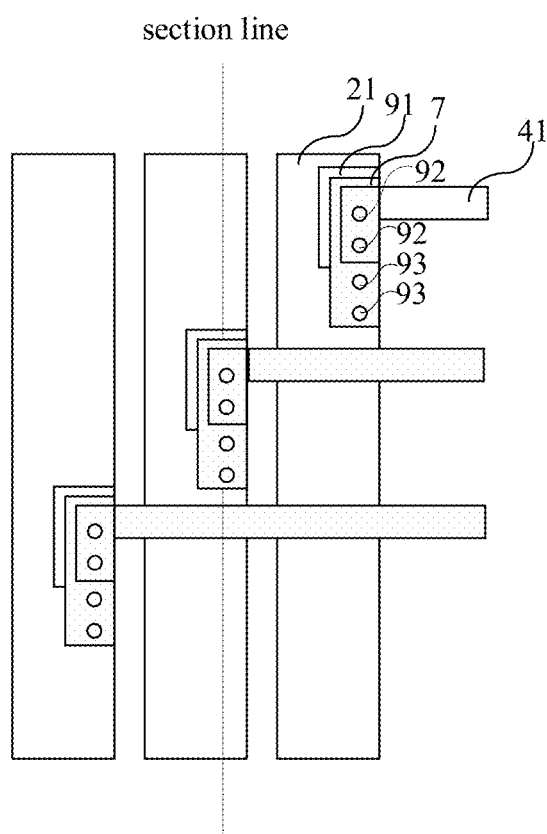
FIG. 3 is a schematic structural diagram of an array substrate according to an embodiment.

In order to solve the above technical problems, an embodiment of this application provides an array substrate. As shown in FIG. 3, the array substrate includes: a first substrate 1; a first conductive layer 2 formed on the first substrate 1; a first passivation layer 3 formed on a first conductive layer 2 and covering part of the first substrate 1; a second conductive layer 4 formed on the first passivation layer 3; a second passivation layer 5 formed on the second conductive layer 4 and covering part of the first passivation layer 3; a first electrode layer 6 formed on the second passivation layer 5 and covering part of the first conductive layer 2, part of the first passivation layer 3, part of the second conductive layer 4, and part of the second passivation layer 5; a liquid crystal layer 7 formed on the first electrode layer 6; a second electrode layer 8 formed on the liquid crystal layer 7; a second substrate 9 formed on the second electrode layer 8. The first conductive layer 2 includes a plurality of first traces 21, and the second conductive layer 4 includes a plurality of second traces 41 corresponding to the respective plurality of first traces 21, where the respective plurality of first traces 21 are connected to the corresponding plurality of second traces 41 through traces of the first electrode layer 6. Each of the plurality of first traces 21 is provided with a target area 91, and a projection of each of the plurality of second traces 41 on a corresponding connected first trace 21 is located in a corresponding target area 91. The target area 91 is configured to reduce a capacitance between each of the plurality of first traces 21 and the second electrode layer 8.

Where, the target area 91 of the first trace 21 refers to an area for reducing the capacitance between the first trace 21 and the second electrode layer 8. The first trace 21 in the target area 91 may be in a hollow state, and the first trace 21 in the target area 91 may also be provided with a groove, and the groove is filled with a non-conductive material to reduce the capacitance between the panels. That is, a capacitance Cl formed between a part of the first trace 21 in the target area 91 (which may be a solid metal or a hollow part on the first trace 21) and the opposing second electrode layer 8 is smaller than a capacitance formed between a part of the first trace 21 outside the target area and the second electrode layer 8. The specific implementation is not limited to the two examples cited here. In some embodiments of this application, the target area 91 is set in the overlapping area between the first trace 21 and the corresponding second trace 41, which effectively reduces the capacitance value of the gate drive circuit trace, reduces the trace load of the gate drive circuit, and reduces the panel power.

Figure 4:
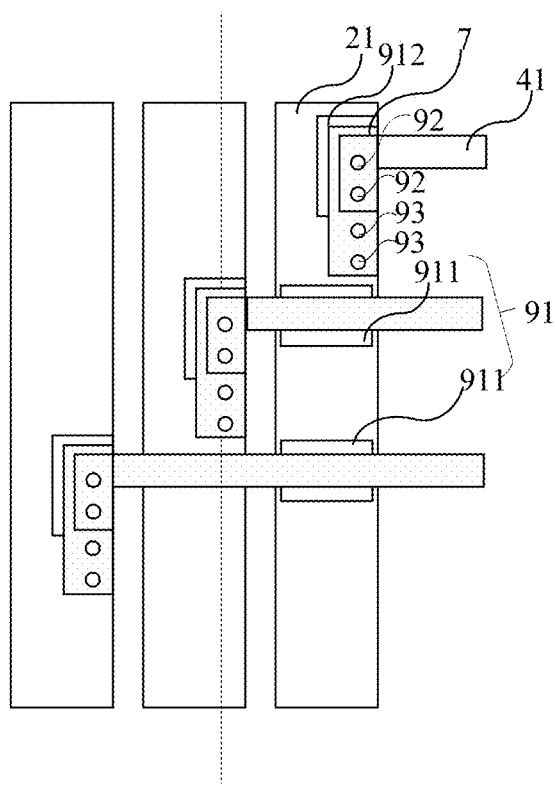
FIG. 4 is a schematic structural diagram of an array substrate according to another embodiment.
Figure 5:
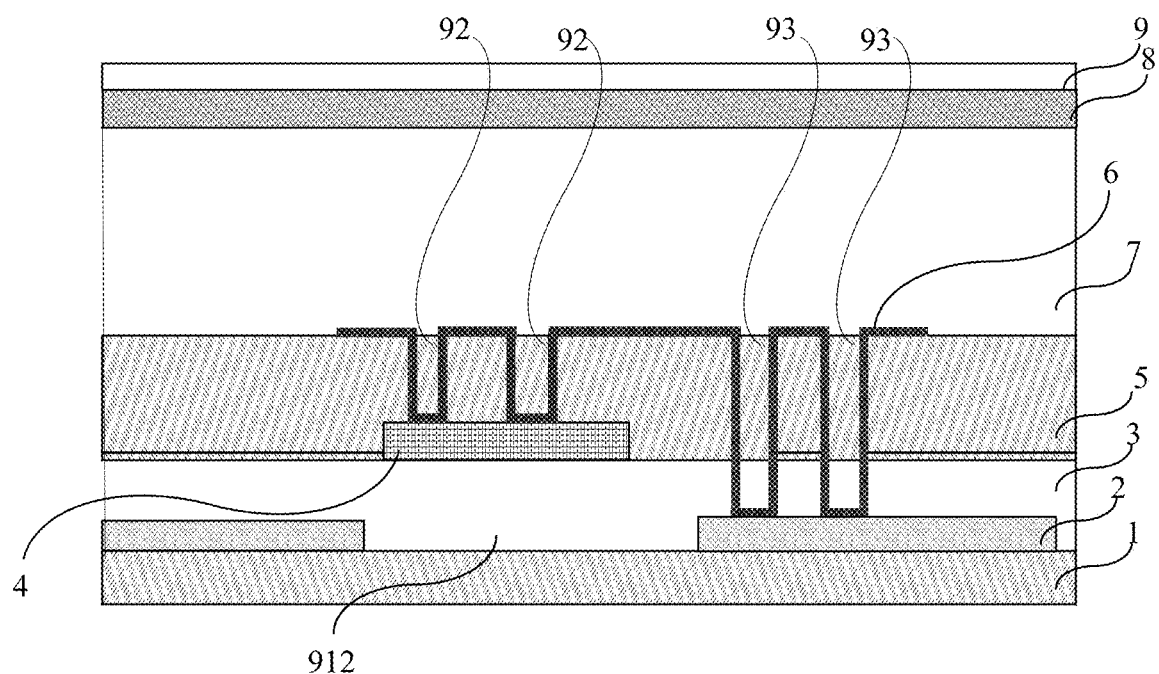
FIG. 5 is a cross-sectional view of the array substrate according to still another embodiment.

In one of the embodiments, as shown in FIGS. 3 to 5, the target area 91 includes a cross-line area 911 formed by each of the plurality of first traces 21 and corresponding each of the plurality of second traces 41. The cross-line area 911 refers to a part where the first trace and the second trace cross and are not connected. In some embodiments of this application, the target area 91 is set in the cross-line area between the first trace 21 and the corresponding second trace 41, which effectively reduces the capacitance value of the gate drive circuit trace, reduces the trace load of the gate drive circuit, and reduces the panel power.

In one of the embodiments, as shown in FIGS. 4 and 5, the target area 91 further includes a cross-connection area 912 between the first trace 21 and the second trace 41. The cross-connection area 912 refers to an area that overlaps with the projection of the second trace 41 on the correspondingly connected first trace 21. Holes are dug or filled with non-conductive materials such as resin in the cross-connection area 912 of the first trace 21 and the second trace 41 to reduce the capacitance, thereby reducing the circuit load of the gate drive circuit.

In one of the embodiments, as shown in FIGS. 3 to 5, the first passivation layer 3 is covered on part of the first substrate 1 in the target area 91. The first passivation layer 3 is covered on part of the first substrate 1 in the target area 91, that is, a hole is dug on the first trace 21. There is no conductive material in the hole, and the first passivation layer 3 fills the part of the area and is in contact with the first substrate 1 to reduce the panel capacitance, thereby reducing the capacitance value of the gate drive circuit trace.

In one of the embodiments, as shown in FIGS. 3 to 5, the target area 91 is filled with a non-conductive material. Fill the target area 91 with non-conductive materials such as resin to reduce the capacitance between the panels to reduce the load of the gate drive circuit trace.

In one of the embodiments, as shown in FIGS. 3 to 5, a first type of conductive bridge hole is formed on the first conductive layer 2, and the first electrode layer 6 is covered on the first conductive layer 2.

In one of the embodiments, as shown in FIGS. 3 to 5, a second type of conductive bridge hole is formed on the second conductive layer 4, and the first electrode layer 6 is covered on the second conductive layer 4.

In one of the embodiments, as shown in FIGS. 3 to 5, a number of the first type of conductive bridge hole is at least two.

In one of the embodiments, as shown in FIGS. 3 to 5, a number of the second type of conductive bridge hole is at least two.

In one of the embodiments, the liquid crystal layer 7 includes a dielectric coefficient, and the dielectric coefficient includes a dielectric coefficient of a parallel vector and a dielectric coefficient of a perpendicular vector. The first-type conductive bridge hole is formed on each first trace 21, and the first electrode layer 6 is covered on the first conductive layer 2 at the same time, and the voltage signal is transmitted to the first electrode layer 6 and the second electrode layer 8 through the conductive bridge hole, so that the dielectric coefficient of the liquid crystal layer 7 approach the dielectric coefficient of the parallel vector (for example: the inclination of the dielectric coefficient direction is controlled by the magnitude of the voltage signal), which effectively further reduces the capacitance value of the trace of the gate drive circuit. Similarly, the second-type conductive bridge hole is formed on each second trace 41, and the second electrode layer 8 is covered on the second conductive layer 4 at the same time, and the voltage signal is transmitted to the second electrode layer 8 and the second electrode layer 8 through the conductive bridge hole, so that the dielectric coefficient of the liquid crystal layer 7 approach the dielectric coefficient of the parallel vector (for example: the inclination of the dielectric coefficient direction is controlled by the magnitude of the voltage signal), which effectively further reduces the capacitance value of the trace of the gate drive circuit.

A display panel, as shown in FIGS. 1 and 5, includes a color filter substrate 10, a driver 30, and the above-mentioned array substrate 20. In the display panel provided by the embodiments of this application, the clock signal generated by the driver 30 is applied to the first trace 21 and the second trace 41 on the array substrate 20 to drive the thin film transistor. A target area 91 is set on the first trace 21 corresponding to each second trace 40, so that the projection of the second trace 41 on the first trace 21 falls within the target area 91. That is, the capacitance at the intersection of the second trace 41 and the first trace 21 connected to it is minimized, thereby reducing the capacitance value of the trace of the gate drive circuit 40 and reducing the panel power.

In one of the embodiments, the target area 91 may include a cross-line area 911 formed by the first trace 21 and the corresponding second trace 41, and/or, a cross-connection area 912 between the first trace 21 and the second trace 41.

A method for manufacturing an array substrate includes:
providing a first substrate; forming a first conductive layer on the first substrate; forming a first passivation layer on the first conductive layer, and making the first passivation layer to be covered on part of the first substrate; forming a second conductive layer on the first passivation layer; forming a second passivation layer on the second conductive layer, and making the second passivation layer to be covered on part of the first passivation layer; forming a first electrode layer on the second passivation layer, and making the first electrode layer to be covered on part of the first conductive layer, part of the first passivation layer, part of the second conductive layer and part of the second passivation layer; forming a liquid crystal layer on the first electrode layer; forming a second electrode layer on the liquid crystal layer; forming a second substrate on the second electrode layer; forming a plurality of first traces on the first conductive layer, and forming a plurality of second traces corresponding to the respective plurality of first traces on the second conductive layer, where the respective plurality of first traces are connected to the corresponding plurality of second traces through traces of the first electrode layer; forming a target area on the first trace, where a projection of the second trace on the first trace is located in the target area. It should be noted that the definitions of nouns in this embodiment are the same as those in the foregoing embodiments, and the working principle is also the same, so it is not repeated here. Where, the target area 91 may include a cross-line area 911 formed by the first trace 21 and the corresponding second trace 41, and/or, a cross-connection area 912 between the first trace 21 and the second trace 41.

In some embodiments of this application, the display panel may include a liquid crystal panel, the liquid crystal panel may include a switch array substrate, a color filter layer substrate and a liquid crystal layer formed between the two substrates, and the display panel may also be an Organic Light-Emitting Diode (OLED) panel or Quantum Dot Light Emitting Diodes (QLED) panel.

The technical features of the above-mentioned embodiments can be combined arbitrarily. To simplify the description, all possible combinations of the technical features in the above-mentioned embodiments are not described. However, as long as there is no contradiction in the combination of these technical features, all should be considered within the scope of this description.

The above-mentioned embodiments only express several implementation manners of this application, and the description is relatively specific and detailed, but it should not be understood as a limitation on the scope of the patent. It should be pointed out that for those of ordinary skill in the art, without departing from the concept of this application, several modifications and improvements can be made, and these all fall within the protection scope of this application. Therefore, the scope of protection of the patent of this application shall be subject to the appended claims.

What is claimed is:
1. An array substrate, comprising:
a first substrate;

a first conductive layer formed on the first substrate;

a first passivation layer formed on the first conductive layer and covering part of the first substrate;

a second conductive layer formed on the first passivation layer;

a second passivation layer formed on the second conductive layer and covering part of the first passivation layer;

a first electrode layer formed on the second passivation layer and covering part of the first conductive layer, part of the first passivation layer, part of the second conductive layer and part of the second passivation layer;

a liquid crystal layer formed on the first electrode layer;

a second electrode layer formed on the liquid crystal layer; and a second substrate formed on the second electrode layer;

wherein the first conductive layer comprises a plurality of first traces, and the second conductive layer comprises a plurality of second traces corresponding to the respective plurality of first traces, wherein the respective plurality of first traces are connected to the corresponding plurality of second traces through traces of the first electrode layer; and wherein each of the plurality of first traces is provided with a target area, and a projection of each of the plurality of second traces on a corresponding connected first trace is located in a corresponding target area, wherein the target area is configured to reduce a capacitance between each of the plurality of first traces and the second electrode layer.

2. The array substrate of claim 1, wherein the target area comprises a cross-line area formed by each of the plurality of first traces and corresponding each of the plurality of second traces.

3. The array substrate of claim 2, wherein the target area further comprises a cross-connection area of each of the plurality of first traces and corresponding each of the plurality of second traces.

4. The array substrate of claim 3, wherein the first passivation layer is covered on part of the first substrate in the target area.

5. The array substrate of claim 3, wherein the target area is filled with a non-conductive material.

6. The array substrate of claim 5, wherein a first type of conductive bridge hole is formed on the first conductive layer, and the first electrode layer is covered on the first conductive layer.

7. The array substrate of claim 6, wherein a second type of conductive bridge hole is formed on the second conductive layer, and the first electrode layer is covered on the second conductive layer.

8. The array substrate of claim 2, wherein the first passivation layer is covered on part of the first substrate in the target area.

9. The array substrate of claim 2, wherein the target area is filled with a non-conductive material.

10. The array substrate of claim 9, wherein a first type of conductive bridge hole is formed on the first conductive layer, and the first electrode layer is covered on the first conductive layer.

11. The array substrate of claim 10, wherein a second type of conductive bridge hole is formed on the second conductive layer, and the first electrode layer is covered on the second conductive layer.

12. The array substrate of claim 1, wherein the first passivation layer is covered on part of the first substrate in the target area.

13. The array substrate of claim 1, wherein the target area is filled with a non-conductive material.

14. The array substrate of claim 13, wherein the liquid crystal layer comprises a dielectric coefficient, and the dielectric coefficient comprises a dielectric coefficient of a parallel vector and a dielectric coefficient of a perpendicular vector.

15. The array substrate of claim 13, wherein a first type of conductive bridge hole is formed on the first conductive layer, and the first electrode layer is covered on the first conductive layer.

16. The array substrate of claim 15, wherein a second type of conductive bridge hole is formed on the second conductive layer, and the first electrode layer is covered on the second conductive layer.

17. The array substrate of claim 16, wherein a number of the second type of conductive bridge hole is at least two.

18. The array substrate of claim 15, wherein a number of the first type of conductive bridge hole is at least two.

19. A display panel, comprising a color filter substrate, a driver and an array substrate;

a first substrate;

a first conductive layer formed on the first substrate;

a first passivation layer formed on the first conductive layer and covering part of the first substrate;

a second conductive layer formed on the first passivation layer;

a second passivation layer formed on the second conductive layer and covering part of the first passivation layer;

a first electrode layer formed on the second passivation layer and covering part of the first conductive layer, part of the first passivation layer, part of the second conductive layer and part of the second passivation layer;

a liquid crystal layer formed on the first electrode layer;

a second electrode layer formed on the liquid crystal layer; and a second substrate formed on the second electrode layer;

wherein the first conductive layer comprises a plurality of first traces, and the second conductive layer comprises a plurality of second traces corresponding to the respective plurality of first traces, wherein the respective plurality of first traces are connected to the corresponding plurality of second traces through traces of the first electrode layer; and wherein each of the plurality of first traces is provided with a target area, and a projection of each of the plurality of second traces on a corresponding connected first trace is located in a corresponding target area, wherein the target area is configured to reduce a capacitance between each of the plurality of first traces and the second electrode layer.

20. The display panel of claim 19, wherein the target area comprises a cross-line area formed by each of the plurality of first traces and corresponding each of the plurality of second traces.

* * * * *